US012731415B2

(12) United States Patent
Ladeia Rodrigues

(10) Patent No.: US 12,731,415 B2
(45) Date of Patent: Sep. 8, 2026

(54) SYSTEMS AND METHODS FOR DETECTING A SOFT POINT ON A ROAD USING A HARD POINT

(71) Applicant: Toyota Jidosha Kabushiki Kaisha, Toyota (JP)

(72) Inventor: Jose Felix Ladeia Rodrigues, Sunnyvale, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 170 days.

(21) Appl. No.: 18/428,007

(22) Filed: Jan. 31, 2024

(65) Prior Publication Data

US 2025/0246004 A1 Jul. 31, 2025

(51) Int. Cl.
*G06V 20/00* (2022.01)
*G06V 20/56* (2022.01)

(52) U.S. Cl.
CPC .................................. *G06V 20/588* (2022.01)

(58) Field of Classification Search
CPC ...... G06V 20/588; G06V 10/26; G06V 10/22; G06V 20/182; G06T 2207/30256; G06T 7/60; B60W 30/12; B60W 2552/53; B60W 40/06; B60W 2556/40; B60W 2552/10; G01C 21/3658; G01C 21/3848; G01C 21/3819; G01C 21/386
See application file for complete search history.

(56) References Cited

U.S. PATENT DOCUMENTS

2013/0328883 A1* 12/2013 Sethia ..................... G06T 11/20 345/441
2021/0403001 A1* 12/2021 Del Pero ............ G01C 21/3841
2023/0083343 A1 3/2023 Chen
2024/0203134 A1* 6/2024 Lee ........................ G06V 10/28

FOREIGN PATENT DOCUMENTS

CN 107330376 A 11/2017
CN 114519700 A 5/2022
CN 114608602 A 6/2022
CN 115116018 A 9/2022

(Continued)

OTHER PUBLICATIONS

Vajak et al., A Rethinking of Real-Time Computer Vision-Based Lane Detection, 2021 IEEE 11th International Conference on Consumer Electronics (ICCE-Berlin) (Year: 2021).*

(Continued)

*Primary Examiner* — Xiao Liu
(74) *Attorney, Agent, or Firm* — Christopher G. Darrow; Darrow Mustafa, PC

(57) ABSTRACT

Systems and methods relate to detecting a soft point on a road starting from a hard point using a sliding window for searching a rasterized representation. A method may include identifying a hard point using rasterized data of a road derived from vehicle data. The method can also include searching a rasterized representation of the road using a sliding window along lane boundaries starting at the hard point, the rasterized representation generated with the vehicle data. The method can also include detecting a soft (Continued)

point from peak patterns of the lane boundaries within the sliding window among the rasterized representation.

20 Claims, 6 Drawing Sheets

(56) References Cited

FOREIGN PATENT DOCUMENTS

| | | | |
|---|---|---|---|
| CN | 116429128 | A | 7/2023 |
| DE | 102020118318 | A1 | 1/2022 |
| KR | 20140074219 | A | 6/2014 |

OTHER PUBLICATIONS

Yu et al., "Laser Data Based Automatic Generation of Lane-Level Road Map for Intelligent Vehicles," Open Science Index, Electrical and Information Engineering, vol. 14, No. 12, 2020, 7 pages.
Kingery et al., "Road Boundary Estimation Using Sparse Automotive Radar Inputs," arXiv:2309.08341, Sep. 15, 2023, 10 pages.
Hadzic et al., "RasterNet: Modeling Free-Flow Speed using LiDAR and Overhead Imagery," Proceedings of the IEEE/CVF Conference on Computer Vision and Pattern Recognition (CVPR) Workshops, 2020, pp. 208-209.
Liang et al., "Learning Lane Graph Representations for Motion Forecasting," Computer Vision—ECCV 2020, vol. 12347, pp. 541-556.

* cited by examiner 500
510
520
530
540
550
100

SYSTEMS AND METHODS FOR DETECTING A SOFT POINT ON A ROAD USING A HARD POINT

TECHNICAL FIELD

The subject matter described herein relates, in general, to detecting a soft point on a road, and, more particularly, to detecting the soft point on a road using a hard point and a sliding window for searching a rasterized representation.

BACKGROUND

Vehicles can be equipped with sensors that facilitate locating objects that include other vehicles, obstacles, pedestrians, etc. within a surrounding environment. For example, a vehicle uses a radar sensor that scans an area with radio waves, while logic associated with the radar sensor analyzes acquired data to detect object presence and other features of the surrounding environment. In another example, a camera acquires information about the surrounding environment from which a system detects aspects of the surrounding environment. This information can form vehicle data that vehicle systems process for improving perceptions within an area so that navigation systems map an area and assist other systems (e.g., automated driving systems) that improve safety.

In one approach, a mapping system collects vehicle data about roads from multiple vehicles. For instance, the mapping system processes images and identifies lane lines about the roads for generating maps. However, generated maps can lack information when roads converge (e.g., a road junction) since mapping systems encounter difficulties identifying and locating lane structures (e.g., a physical boundary, a non-physical boundary, etc.), particularly involving road junctions. An existing difficulty is that junctions can have physical and non-physical boundaries having various geometries between lane lines. Therefore, vehicles travel into areas with maps lacking complete information at road convergences and junctions, which hampers the reliability of advanced systems and decreases safety.

SUMMARY

In one embodiment, example systems and methods relate to detecting a soft point on a road starting from a hard point using a sliding window for searching a rasterized representation. In various implementations, systems generate maps from vehicle data having junction information, road boundaries, lane lines, etc. Nevertheless, generated maps can be devoid with information about lane types and structures near complex road areas (e.g., junctions) from vehicle data having errors. For instance, a generated map lacks information about a soft point where roads having complex geometries form. Thus, systems performing involved tasks that demand information about soft points face less reliable and unsafe conditions.

Therefore, in one embodiment, a detection system improves road mappings by identifying a hard point and detecting a soft point using a sliding window starting from the hard point. Here, identifying the hard point may involve using rasterized data derived from vehicle data. Subsequently, the detection system can search a rasterized representation having road information differing from the rasterized data for the soft point (e.g., a painted boundary, a taper point, etc.) using a sliding window along lane boundaries. The search may start at the hard point (e.g., a concrete boundary, a physical boundary, etc.) since they represent a fundamental point on roads and allow derivation of additional lane information. In one approach, the detection system detects a soft point from peak patterns of the lane boundaries within the sliding window. For example, the peak patterns having multiple peak values satisfying a threshold indicate that a soft point is approaching on the road. Accordingly, the detection system improves mapping and navigation by detecting soft points on a road, thereby improving safety for complicated tasks demanding map information that is detailed and accurate.

In one embodiment, a detection system for detecting a soft point on a road starting from a hard point using a sliding window for searching a rasterized representation is disclosed. The detection system includes a memory storing instructions that, when executed by a processor, cause the processor to identify a hard point using rasterized data of a road derived from vehicle data. The instructions also include instructions to search a rasterized representation of the road using a sliding window along lane boundaries starting at the hard point, the rasterized representation generated with the vehicle data. The instructions also include instructions to detect a soft point from peak patterns of the lane boundaries within the sliding window among the rasterized representation.

In one embodiment, a non-transitory computer-readable medium for detecting a soft point on a road starting from a hard point using a sliding window for searching a rasterized representation and including instructions that when executed by a processor cause the processor to perform one or more functions is disclosed. The instructions include instructions to identify a hard point using rasterized data of a road derived from vehicle data. The instructions also include instructions to search a rasterized representation of the road using a sliding window along lane boundaries starting at the hard point, the rasterized representation generated with the vehicle data. The instructions also include instructions to detect a soft point from peak patterns of the lane boundaries within the sliding window among the rasterized representation.

In one embodiment, a method for detecting a soft point on a road starting from a hard point using a sliding window for searching a rasterized representation is disclosed. In one embodiment, the method includes identifying a hard point using rasterized data of a road derived from vehicle data. The method also includes searching a rasterized representation of the road using a sliding window along lane boundaries starting at the hard point, the rasterized representation generated with the vehicle data. The method also includes detecting a soft point from peak patterns of the lane boundaries within the sliding window among the rasterized representation.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with detecting a soft point on a road starting from a hard point using a sliding window for searching a rasterized representation are disclosed herein. In various implementations, areas have roads with converging lanes at junctions such as a soft point (e.g., a soft nose, a taper point, etc.) and a hard point. Converging lanes can have painted lines on the roads and/or physical boundaries between road boundaries (e.g., multiple highways merging). A hard point is a junction that includes a physical boundary, such as merging lane dividers that are concrete. A soft nose is a painted boundary located at merging lanes typically associated with different roads. A taper point can be the joining point of lanes. In various implementations, systems acquire vehicle data from vehicles on a road to identify and map junctions. However, these systems encounter difficulties locating and detecting a soft point without a reference point that is reliable and errors caused by data discrepancies. As such, systems map certain areas without soft points and other junctions, thereby creating risky conditions for automated driving and navigation that execute complex tasks relying on maps having detailed and reliable road information.

Therefore, in one embodiment, a detection system locates and detects a soft point within a rasterized representation upon identifying a hard point with rasterized data, thereby enhancing available information about a junction. In one approach, the detection system searches the rasterized representation having differing road information from the rasterized data using vehicle data. Searching the rasterized representation can detect the soft point (e.g., a soft nose, a taper point, etc.) with a sliding window along the lane boundaries (e.g., a continuous line, a dashed line, etc.) starting at the hard point. For example, the sliding window has a tracker that detects peaks for a continuous line and another tracker that detects peaks for a dashed line within a pattern while the sliding window moves along the lane boundaries. In this way, the detection system can identify the soft point when there are matching peaks beyond a threshold level with the pattern and the matching peaks subsequently decrease, indicating an endpoint among the lane boundaries. Accordingly, the detection system locates a soft point and increases junction information using a sliding window for searching a rasterized representation and detects relevant peaks within peak patterns, thereby assisting the map generation and improving advanced tasks that demand junction information that is detailed.

Figure 1:
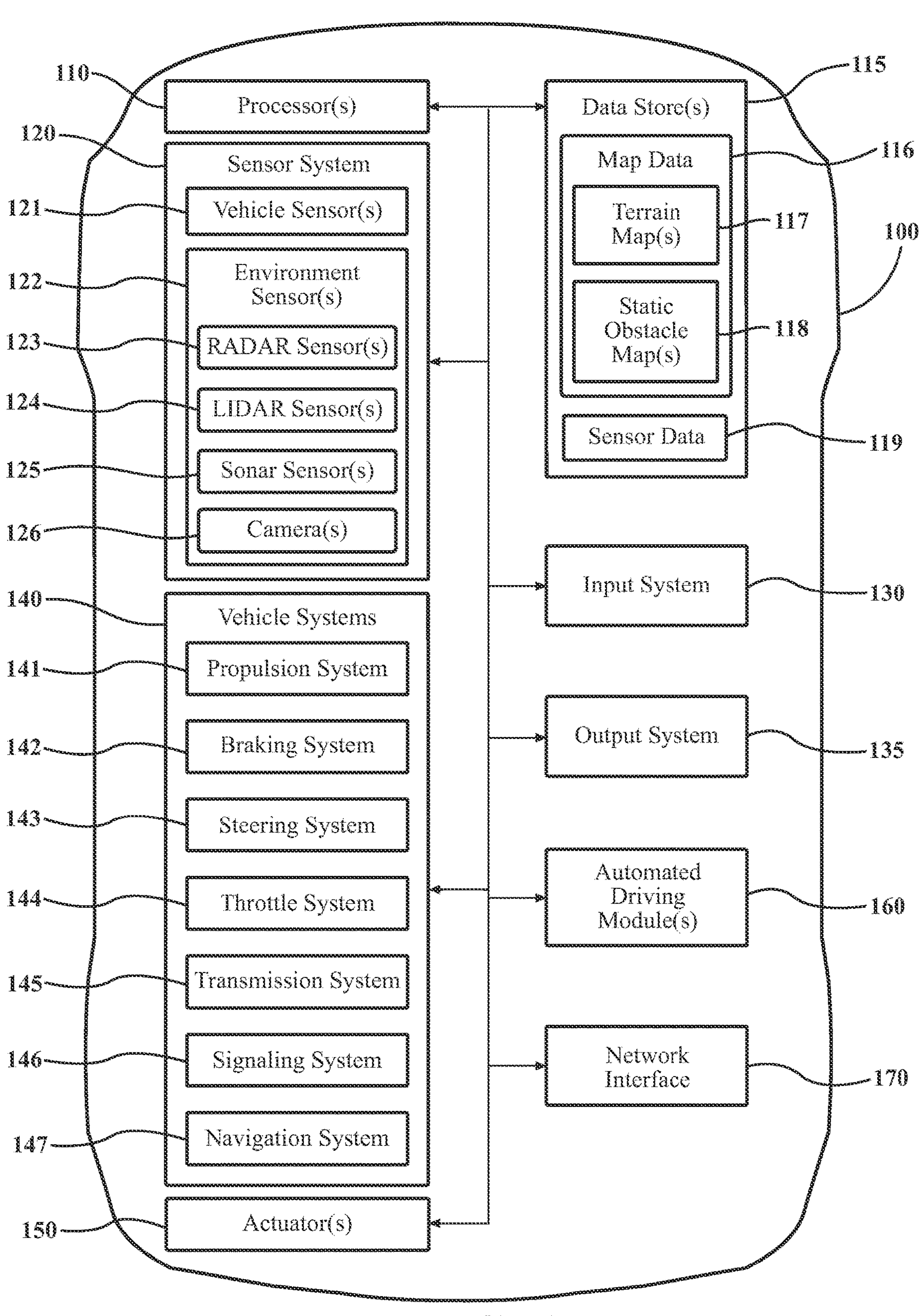
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, a detection system 200 acquires vehicle data 270 from road-side units (RSU), consumer electronics (CE), mobile devices, robots, drones, and so on that benefit from the functionality discussed herein associated with detecting a soft point on a road starting from a hard point using a sliding window for searching a rasterized representation.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a network interface 170 (e.g., a wireless transceiver, a wireless protocol, etc.) that communicates the sensor data 119 to the detection system 200 that is implemented to perform methods and other functions as disclosed herein relating to detecting a soft point on a road starting from a hard point using a sliding window for searching a rasterized representation.

Figure 2:
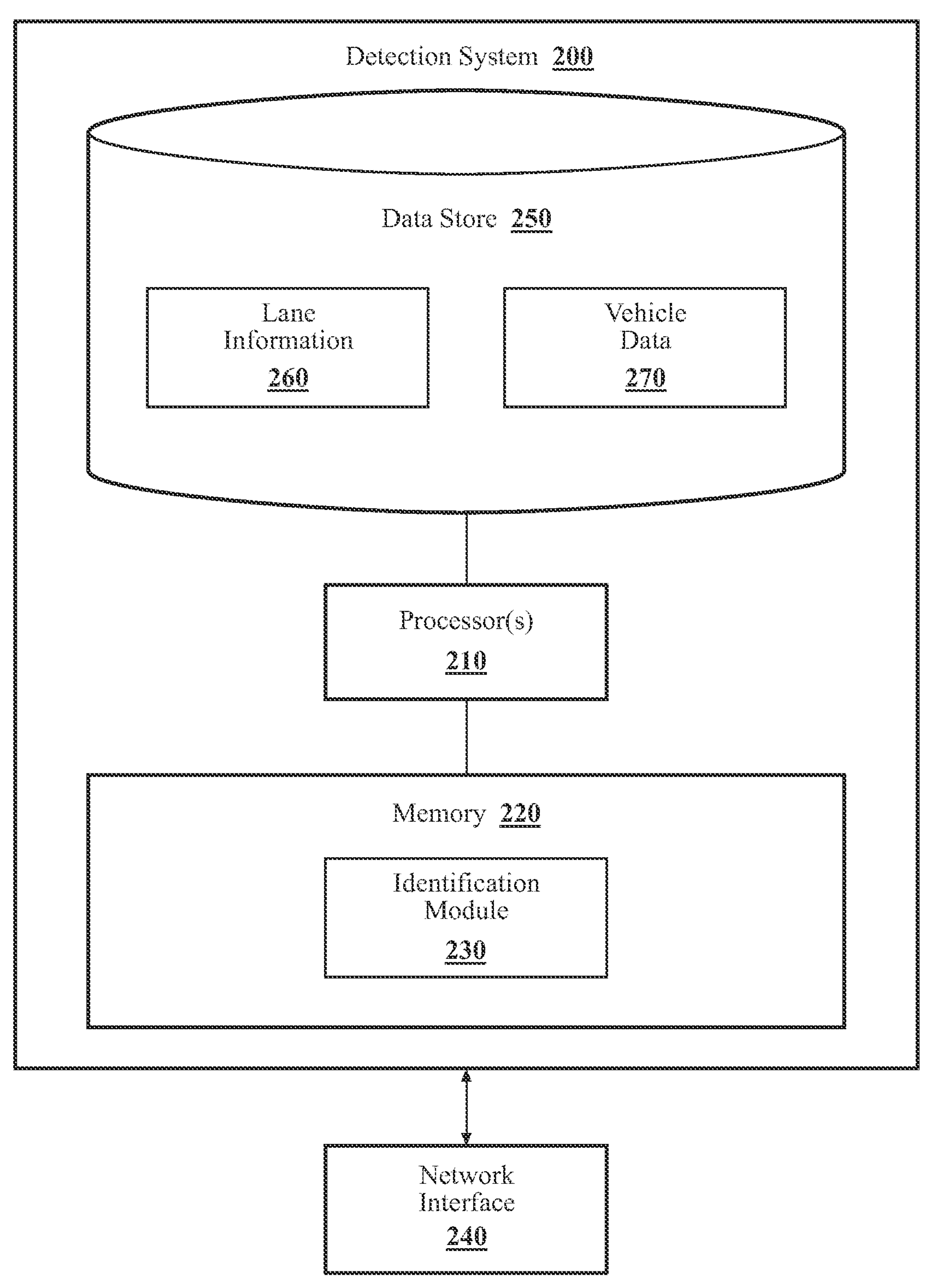
FIG. 2 illustrates one embodiment of a detection system that is associated with detecting a soft point on a road using a sliding window for searching a rasterized representation associated with a road from a hard point.

With reference to FIG. 2, one embodiment of the detection system 200 is further illustrated. The detection system 200, in various embodiments, is an abstract form of the detection system 200 that can be implemented using a cloud-based service, an edge server, a network server, etc. The detection system 200 can include a processor(s) 210 and a memory 220 that stores an identification module 230. The memory 220 is a random-access memory (RAM), a read-only memory (ROM), a hard-disk drive, a flash memory, or other suitable memory for storing the identification module 230. The identification module 230 is, for example, computer-readable instructions that when executed by the processor(s) 210 cause the processor(s) 210 to perform the various functions disclosed herein.

With reference to FIG. 2, the detection system 200 generally includes instructions that function to control the processor(s) 210 to receive data inputs from one or more sensors of the vehicle 100 over a network interface 240 (e.g., a wireless transceiver, a wireless protocol, etc.). Although examples reference the vehicle 100, the detection system 200 can acquire the vehicle data 270 from multiple vehicles, devices, networks, etc. Furthermore, the inputs are, in one embodiment, measurements of one or more objects (e.g., lane lines, lane boundaries, etc.) in an environment proximate to the vehicle 100 and/or other aspects about the surroundings. As provided for herein, the detection system 200, in one embodiment, acquires the vehicle data 270 that includes at least images from a camera. In further arrangements, the detection system 200 acquires the vehicle data 270 from further sensors such as radar sensors 123, LIDAR sensors 124, and other sensors as may be suitable for identifying vehicles and locations of the vehicles. For instance, the vehicle data 270 is Toyota™ Safety Sense (TSS) data from a sensor system 120 having information about lane lines, road boundaries, lane boundaries, road structure, etc.

Additionally, the vehicle 100 can undertake various approaches to fuse data from multiple sensors before communicating the sensor data 119 over the network interface 170 and/or from sensor data acquired over the network interface 170. As such, the vehicle data 270, in one embodiment, represents perception combinations acquired from multiple sensors. Furthermore, the vehicle data 270 may also include, for example, information about lane markings, remotely instruct the sensor system 120 to acquire the vehicle data 270 about an area, etc. In one approach, the vehicle data 270 includes information about a forward direction alone when, for example, the vehicle 100 lacks further sensors to include additional regions about the vehicle and/or the additional regions are not scanned due to other reasons.

Moreover, in one embodiment, the detection system 200 includes a data store 250. In one embodiment, the data store 250 is a database. The database is, in one embodiment, an electronic data structure stored in the memory 220 or another data store and that is configured with routines that can be executed by the processor(s) 210 for analyzing stored data, providing stored data, organizing stored data, and so on. Thus, in one embodiment, the data store 250 stores data used by the identification module 230 in executing various functions. In one embodiment, the data store 250 includes the vehicle data 270 along with, for example, metadata that characterize various aspects of sensor data. For example, the metadata can include location coordinates (e.g., longitude and latitude), relative map coordinates or tile identifiers, time/date stamps from when the separate vehicle data 270 was generated, and so on. As further explained below, the vehicle data 270 includes detected keypoints from a vehicle(s) that indicate geographical coordinates associated with specific points-of-interest. Such keypoints are derivable from data captured by the sensor system 120 (e.g., an image). Additionally, the vehicle data 270 can include positioning data received from a network (e.g., global positioning, base station coordinates, a network address, etc.) that the identification module 230 processes to derive information about lane boundaries.

Figure 3A:
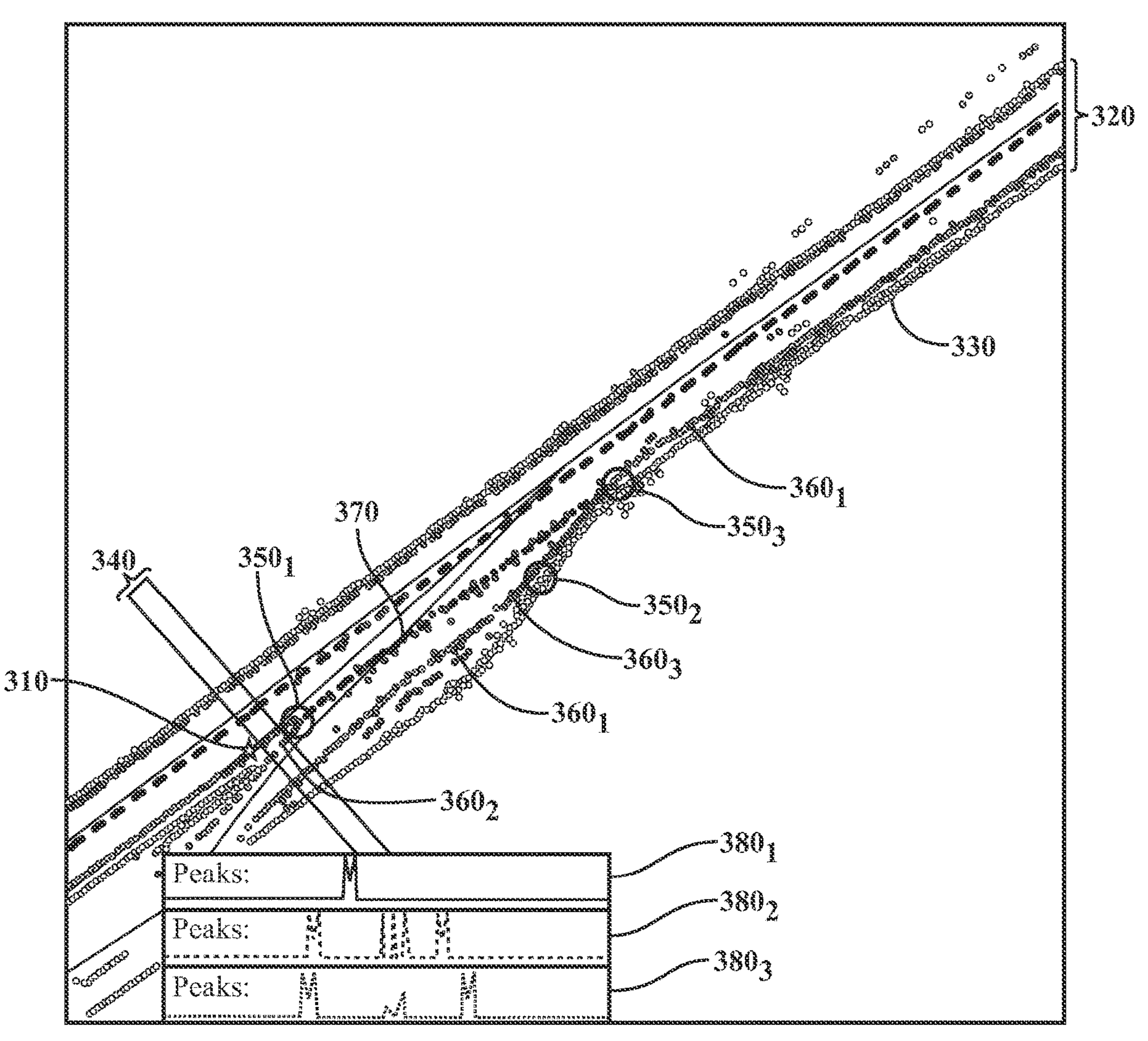
FIGS. 3A and 3B illustrate examples of the detection system from FIG. 2 searching the rasterized representation with the sliding window for the soft point starting at the hard point.
Figure 3B:
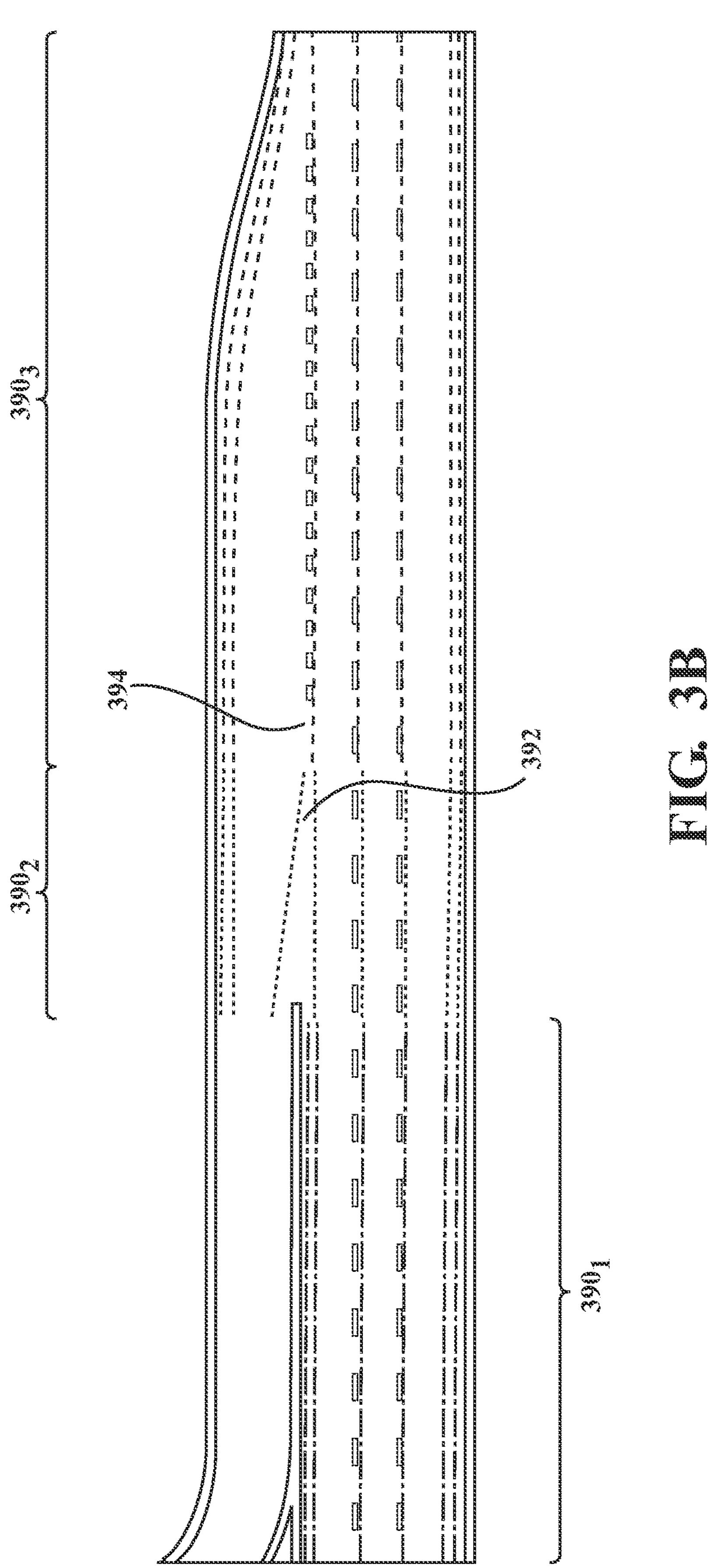

Now turning to FIGS. 3A and 3B, embodiments of the detection system 200 searching the rasterized representation with the sliding window for a soft point starting at a hard point are illustrated. In particular, the identification module 230 can include instructions that cause a processor(s) 210 to identify a hard point 310 using rasterized data of a road 320 derived from the vehicle data 270. The hard point 310 can be a physical boundary at a road junction of different roads and soft points can be a painted boundary where lane boundaries merge, a taper point as the road junction, etc. Identifying the hard point 310 allows the detection system 200 to detect additional lane information (e.g., soft points) since the hard point 310 represents a fundamental and significant point.

In one approach, the detection system 200 searches a rasterized representation 330 of the road 320 using a sliding window 340 along lane boundaries from the lane information 260. The sliding window 340 starts at the hard point 310 as a potentially fundamental and significant point within the road 320. The detection system 200 can generate the rasterized representation 330 with the vehicle data 270, such as by mapping keypoints having geographical coordinates detected from the vehicle data 270 of a vehicle(s) (e.g., a vehicle fleet) and include information about the lane boundaries from the lane information 260. In various implementations, the detection system 200 computes rasterized keypoints from the vehicle data 270 and plots the rasterized keypoints in a colorized map such that a pixel has a latitude and a longitude from the real world. A keypoint plot can suggest structural relationships such as a dashed line within a certain distance of a dotted line from the hard point 310 being a merging lane. In this way, the detection system 200 identifies the lane boundaries and soft points through the visual representation of rasterization, logical patterns, and relationships between lane boundaries, lines, types, etc.

Regarding soft point detections, the detection system 200 may detect soft points $350_1$-$350_3$ from peak patterns $380_1$-$380_3$ of lane boundaries found within the sliding window 340 among the rasterized representation 330. The lane boundaries can be stored in the lane information 260 within the data store 250 and also include road boundaries, etc. Road boundaries can define physical (e.g., concrete), non-physical (painted), hard, soft, etc. road edges and junctions including related coordinates (e.g., relative coordinates, geographical coordinates, etc.) on the road 320. Lane boundaries can define continuous, dashed, dotted, solid, unknown etc. boundaries on the road 320. Thus, in one embodiment, the detection system 200 searches the rasterized representation 330 of the road 320 using the sliding window 340 along lane boundaries without factoring road boundaries upon identifying the hard point 310 as a guiding point.

In one embodiment, the soft points $350_1$-$350_3$ are associated with different lane boundaries transitioning and represent different junction types. For example, the soft point $350_1$ is a soft nose that represents a painted boundary located at merging lane boundaries of different roads and a lane group as defined below. In contrast, the soft points $350_2$ and $350_3$ can be taper points representing lanes joining and converging and may exclude lane markers associated with the road 320. Furthermore, the peak patterns $380_1$-$380_3$ can indicate the soft points $350_1$-$350_3$ for various types. For instance, the peak pattern $380_1$ indicates the soft point $350_1$ when peak values for a solid line $360_2$ reach a peak value (e.g., five) and subsequently drop rapidly within the sliding window 340. In this scenario, the detection system 200 can also further increase detection reliability for the soft point $350_1$ through finding a dashed line 370 while the sliding window 340 is empty without other lane boundaries. On the contrary, the detection system 200 finding a change within the sliding window 340 from a continuous line $360_1$ to a solid line $360_3$ may detect the soft point $350_2$ as a taper point once the peak pattern $380_2$ reaches a threshold count (e.g., three) without having peaks from other lane boundaries within the sliding window 340. In yet another example, the detection system 200 detects the soft point $350_3$ as a taper point when the dashed line 370 transitions and merges with the continuous line $360_1$ within the peak pattern $380_3$. Accordingly, the detection system 200 efficiently searches and tracks peak patterns for various scenarios involving different types of lane boundaries and detects soft points accurately.

Moreover, the detection system 200 can execute additional searching techniques prior to detection that can increase reliability. For example, the detection system 200 locates keypoint clusters within the sliding window 340 for a change in a lane group, the change associated with multiple peak values of the peak patterns $380_1$-$380_3$ varying. The searching can include locating lane groups to improve the detection of the soft points $350_1$-$350_3$. A lane group can represent an area having a road structure, lane types, lane quantities, etc. parameter(s) that are constant for the road 320. As such, a new lane group may begin when a road structure, lane types, lane quantities, etc. substantially changes. Relationships can exist between a lane group and junctions, such as a lane beginning at the hard point 310 and ending at one of the soft points $350_1$-$350_3$ that is detectable with the sliding window 340. Detectability involves finding value changes within the peak patterns $380_1$-$380_3$ that logically relate to lane structure and groups. Furthermore, the sliding window 340 may have a fixed size that relates to lane boundaries and a lane group. Still, in one embodiment, the sliding window 340 is independent from lane information that defines a lane group. Therefore, the detection system 200 searching and detecting soft points accurately can involve various schemes that associate logical relationships between a hard point, lane boundaries, etc.

As an illustration of lane groups, FIG. 3B is an example where a road includes lane groups $390_1$-$390_3$. For example, the lane group $390_1$ has three lanes between road boundaries without including a merging lane. The lane group $390_2$ differs from $390_1$ since the merging lane (i.e., a new lane type) emerges in an area and combines with the three lanes between road boundaries, thereby changing parameters of the lane group $390_1$. Furthermore, lane group $390_3$ changes parameters more than the lane group $390_1$ with the merging lane tapering with the three lanes between the road boundaries.

Regarding schemes for detecting soft points, the detection system 200 may detect the soft points $350_1$-$350_3$ through consecutively tracking the continuous line $360_1$ and the dashed line 370 separately within the sliding window 340 for peak values that are similar within the peak patterns. In this way, the same sliding window 340 has multiple trackers for various lane boundaries that move along road boundaries associated with the road 320. Here, the continuous line $360_1$ and the dashed line 370 are associated with the lane boundaries of the lane information 260. Changes among and between the continuous line $360_1$ and the dashed line 370 can indicate the soft points $350_1$-$350_3$ when tracked and compared against the peak patterns $380_1$-$380_3$. In one approach, the tracking involves identifying a transition point associated with the continuous line $360_1$ and the dashed line 370 converging for determining that the soft point $350_2$ is a taper point when peak values decrease within the sliding window 340. For example, multiple peak values between different lane boundaries satisfying a threshold value(s) and matching similar horizontal positions within the peak patterns $380_1$-$380_3$ and subsequently decreasing indicate an endpoint among the lane boundaries. Accordingly, the identification module 230 and the detection system 200 effectively and efficiently detect the soft points $350_1$-$350_3$ on the road 320 through using different trackers according to lane types that increases map details for system tasks that are critical (e.g., automated driving), thereby improving safety.

In various implementations, the detection system 200 adapts geometries and structure of a lane group from the peak patterns $380_1$-$380_3$ that allows map construction with the lane group, the hard point 310, and the soft points $350_1$-$350_3$. For example, the detection system 200 searches a rasterized representation of the lane group $390_2$ for a soft point using a sliding window starting at the hard point 392. The soft point 394 is located when peak patterns of lane boundaries associated with the lane group $390_2$ reach a common level, fall, and subsequently locates another peak relative to a threshold value. Furthermore, detecting the soft point 394 from the hard point 392 can assist the detection system 200 to reliably estimate a breaking point for lane boundaries and correspondingly the lane group $390_3$ starting. Thus, the detection system 200 augments information about lane groups on a road that may otherwise be absent, thereby improving mapping.

Figure 4:
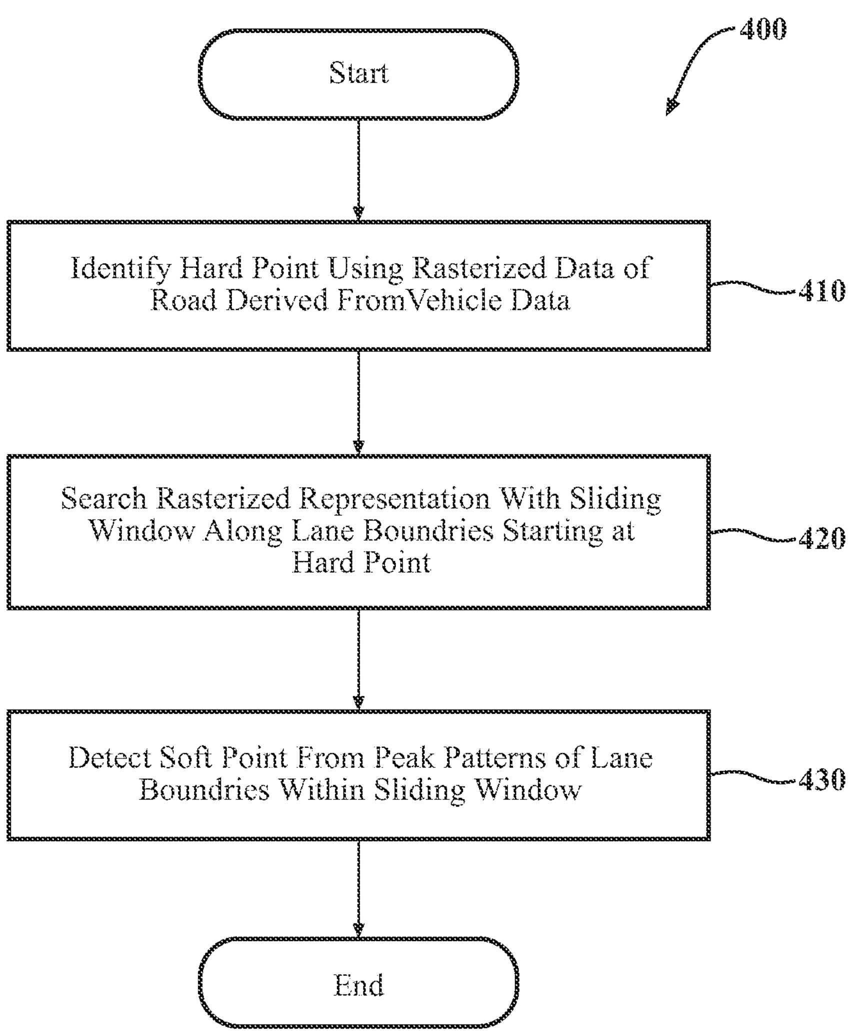
FIG. 4 illustrates one embodiment of a method that is associated with identifying the hard point using rasterized data of the road and detecting the soft point from peak patterns of lane boundaries within the sliding window.

Now turning to FIG. 4, a flowchart of a method 400 that is associated with identifying a hard point using rasterized data of a road and detecting a soft point from peak patterns of lane boundaries within a sliding window is illustrated. Method 400 will be discussed from the perspective of the detection system 200 of FIG. 2. While method 400 is discussed in combination with the detection system 200, it should be appreciated that the method 400 is not limited to being implemented within the detection system 200 but is instead one example of a system that may implement the method 400.

At 410, the identification module 230 identifies a hard point using rasterized data of a road derived from vehicle data. As previously explained, the hard point can be a physical boundary at a road junction, such as involving different roads, varying road structures, road boundaries, etc. On the contrary, soft points can be a painted boundary where lane boundaries merge, a taper point as the road junction, etc. The detection system 200 can detect additional lane information (e.g., soft points) starting at a hard point as they can represent a fundamental and significant point for roads. Furthermore, the detection system 200 can generate the rasterized data, a rasterized representation, etc. of the road with the vehicle data that is similar, identical, different, etc. For example, rasterizing information can involve mapping keypoints having geographical coordinates detected from the vehicle data of the vehicle(s) 100 and include information about lane boundaries. In one embodiment, the detection system 200 computes rasterized keypoints from the vehicle data and plots the rasterized keypoints. A keypoint plot can include real-world coordinates that suggest relationships, such as a dashed line within a certain distance of a dotted line from the hard point being a merging lane. Accordingly, the detection system 200 identifies the lane boundaries and soft points through rasterization and inferring logical patterns and relationships between lane boundaries, lines, types, etc.

At 420, the detection system 200 searches a rasterized representation with a sliding window along lane boundaries starting at the hard point. In one approach, the detection system 200 locates keypoint clusters within the sliding window for changing lane groups. Here, a change can be multiple peak values of peak patterns tracked within the sliding window varying in a certain manner. As explained above, searching for lane groups can improve the detection of soft points. A lane group can represent an area having a road structure, lane types, lane quantities, etc. parameter(s) that are constant on the road. In this way, a new lane group may begin when a road structure, lane types, lane quantities, etc. substantially change. Furthermore, relationships can exist between a lane group and junctions, such as detecting that a lane begins at the hard point and ends at a soft point within the sliding window and values within the peak patterns change according to threshold values that are defined.

At 430, the detection system 200 detects a soft point from the peak patterns of the lane boundaries within the sliding window. In one approach, the detection system 200 detects various soft points through consecutively tracking continuous lines and the dashed lines separately within the sliding window for peak values within the peak patterns that are common. As such, the same sliding window can have multiple trackers for various lane boundaries that move along road boundaries. For example, different trackers measure changes in peak counts among and between continuous and dashed lines. In this example, the peak counts indicate a soft point as a soft nose when multiple peaks match patterns and attain certain threshold levels (e.g., five).

In various implementations, the tracking involves identifying a taper point associated with a continuous line and a dashed line when the lines converge and the peak values decrease after forming a certain pattern on a raster plot. In another example, multiple peak values between different lane boundaries satisfy a threshold value(s) and form similar horizontal positions within multiple peak patterns that are plotted and subsequently decrease to indicate an endpoint among the lane boundaries. Accordingly, the detection system 200 detects various types of soft points on the road through different trackers and techniques from lane types that increase system confidence and functionality (e.g., automated driving), thereby improving robustness and safety.

Figure 5:
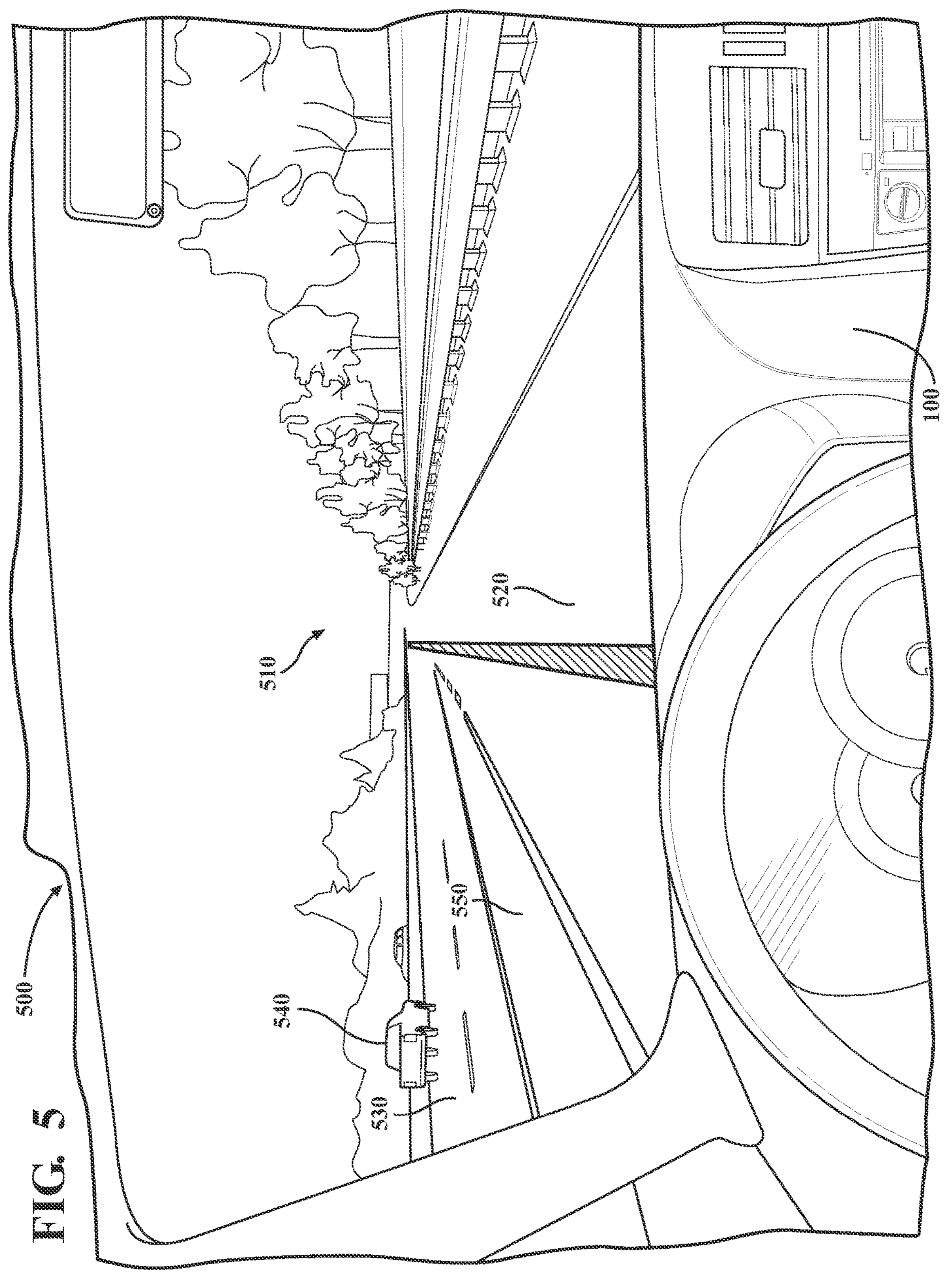
FIG. 5 illustrates a vehicle traveling within a driving environment using maps generated with the hard point, the soft point, and junction information derived with the detection system.

Now referring to FIG. 5, a vehicle 100 traveling within a driving environment 510 using maps generated with a detected soft point and other junctions is illustrated in example 500. In FIG. 5, the vehicle 100 is traveling autonomously on a merging lane 520 and merging onto a road 530. Here, the road 530 includes a vehicle 540. The vehicle 100 receives a detailed map using a connection over the network interface 170. The detailed map indicates a hard point and subsequent soft nose as a junction 550 between the merging lane 520 and the road 530. In particular, the map was generated by the identification module 230 identifying the hard point using rasterized data of the merging lane 520 and the road 530 derived from the vehicle data 270. The detection system 200 detects the soft nose using a sliding window. For instance, the hard point and soft nose associated with the junction 550 form peak patterns of lane boundaries within the sliding window. In one approach, the merging lane 520 and the road 530 come together at the hard point and the junction 550 and form a new lane group having two lanes. Accordingly, the vehicle 100 safely and autonomously navigates the road 530 using detailed information about the hard point and soft nose associated with the junction 550, thereby improving system reliability and road safety for the vehicle 540.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate to the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110 and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110 and/or the automated driving module(s) 160 may control some or all of the vehicle systems 140 and, thus, may be partially or fully autonomous as defined by the society of automotive engineers (SAE) levels 0 to 5.

The processor(s) 110 and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110 and/or the automated driving module(s) 160 may control some or all of the vehicle systems 140.

The processor(s) 110 and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110 and/or the automated driving module(s) 160 can control the direction and/or speed of the vehicle 100. The processor(s) 110 and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 119. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5 but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A detection system comprising:

a memory storing instructions that, when executed by a processor, cause the processor to:

identify a hard point using rasterized data of a road derived from vehicle data;

search a rasterized representation of the road using a sliding window along lane boundaries starting at the hard point, the rasterized representation generated with the vehicle data;

detect a soft point from peak patterns of the lane boundaries within the sliding window among the rasterized representation; and track a continuous line and a dashed line among the lane boundaries within the sliding window for peak values and, upon a multiple of the peak values within the peak patterns satisfying a threshold, identify a transition point associated with the continuous line and the dashed line and a convergence point as the soft point when the peak values decrease.

2. The detection system of claim 1, wherein the instructions to detect the soft point further include instructions to:

track the continuous line and the dashed line separately within the sliding window for the peak values within the peak patterns that are similar.

3. The detection system of claim 2, wherein the peak values decreasing indicates an endpoint among the lane boundaries.

4. The detection system of claim 1, wherein the road includes a lane group that represents an area having a road structure, lane types, and lane quantities that are constant, and the hard point indicates a start of the lane group, and the soft point indicates the lane group is ending.

5. The detection system of claim 4 further including instructions to:

adapt geometries and structure of the lane group from the peak patterns; and construct a map with the lane group, the hard point, and the soft point.

6. The detection system of claim 4, wherein the instructions to search the rasterized representation further include instructions to:

locate keypoint clusters within the sliding window for a change in the lane group, the change associated with the multiple peak values of the peak patterns varying.

7. The detection system of claim 4, wherein the sliding window has a fixed size according to the lane boundaries and the lane group.

8. The detection system of claim 1, wherein the rasterized representation maps keypoints having geographical coordinates detected from the vehicle data and the rasterized representation includes the lane boundaries.

9. The detection system of claim 1, wherein the hard point is a physical boundary at a road junction of different roads, and the soft point is one of a painted boundary where the lane boundaries merge and a taper point as the road junction.

10. The detection system of claim 1, wherein the sliding window is independent from lane information that defines a lane group.

11. A non-transitory computer-readable medium comprising: instructions that when executed by a processor cause the processor to:

identify a hard point using rasterized data of a road derived from vehicle data;

search a rasterized representation of the road using a sliding window along lane boundaries starting at the hard point, the rasterized representation generated with the vehicle data;

detect a soft point from peak patterns of the lane boundaries within the sliding window among the rasterized representation; and track a continuous line and a dashed line among the lane boundaries within the sliding window for peak values and, upon a multiple of the peak values within the peak patterns satisfying a threshold, identify a transition point associated with the continuous line and the dashed line and a convergence point as the soft point when the peak values decrease.

12. A method comprising:

identifying a hard point using rasterized data of a road derived from vehicle data;

searching a rasterized representation of the road using a sliding window along lane boundaries starting at the hard point, the rasterized representation generated with the vehicle data;

detecting a soft point from peak patterns of the lane boundaries within the sliding window among the rasterized representation; and tracking a continuous line and a dashed line among the lane boundaries within the sliding window for peak values and, upon a multiple of the peak values within the peak patterns satisfying a threshold, identifying a transition point associated with the continuous line and the dashed line and a convergence point as the soft point when the peak values decrease.

13. The method of claim 12, wherein detecting the soft point further includes:

tracking the continuous line and the dashed line separately within the sliding window for the peak values within the peak patterns that are similar.

14. The method of claim 13, wherein the peak values decreasing indicates an endpoint among the lane boundaries.

15. The method of claim 12, wherein the road includes a lane group that represents an area having a road structure, lane types, and lane quantities that are constant, and the hard point indicates a start of the lane group, and the soft point indicates the lane group is ending.

16. The method of claim 15 further comprising:

adapting geometries and structure of the lane group from the peak patterns; and constructing a map with the lane group, the hard point, and the soft point.

17. The method of claim 15, wherein searching the rasterized representation further includes:

locating keypoint clusters within the sliding window for a change in the lane group, the change associated with the multiple peak values of the peak patterns varying.

18. The method of claim 15, wherein the sliding window has a fixed size according to the lane boundaries and the lane group.

19. The method of claim 12, wherein the rasterized representation maps keypoints having geographical coordinates detected from the vehicle data and the rasterized representation includes the lane boundaries.

20. The method of claim 12, wherein the hard point is a physical boundary at a road junction of different roads, and the soft point is one of a painted boundary where the lane boundaries merge and a taper point as the road junction.

* * * * *